United States Patent
Salgado et al.

(10) Patent No.: US 8,665,463 B2
(45) Date of Patent: Mar. 4, 2014

(54) SHARING COMMON PRINTING PASSWORDS AMONG MULTIPLE PRINTING DEVICES CONNECTED TO NETWORK

(75) Inventors: David Salgado, Victor, NY (US); Richard Schwartz, Portland, OR (US); Matthew Fabrizi, Penfield, NY (US); Alan K. Robertson, Rochester, NY (US); Jeremy H. Griffith, East Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 363 days.

(21) Appl. No.: 13/036,546

(22) Filed: Feb. 28, 2011

(65) Prior Publication Data
US 2012/0218579 A1 Aug. 30, 2012

(51) Int. Cl.
*G06F 3/12* (2006.01)
(52) U.S. Cl.
CPC .................................. *G06F 3/1238* (2013.01)
USPC ....................................... 358/1.14; 358/1.15
(58) Field of Classification Search
USPC .............................................. 358/1.14, 1.15
See application file for complete search history.

(56) References Cited

U.S. PATENT DOCUMENTS

| | | | |
|---|---|---|---|
| 7,099,026 B1 | 8/2006 | Hren | |
| 7,251,049 B2 | 7/2007 | Kurokawa et al. | |
| 7,755,794 B2 | 7/2010 | Martin et al. | |
| 8,169,633 B2 | 5/2012 | Aikens et al. | |
| 2002/0036790 A1* | 3/2002 | Nishiyama | 358/1.14 |
| 2003/0014368 A1 | 1/2003 | Leuring et al. | |
| 2004/0034685 A1 | 2/2004 | Suzuki et al. | |
| 2006/0256364 A1* | 11/2006 | Yamamoto | 358/1.14 |
| 2010/0046553 A1 | 2/2010 | Daigle et al. | |

* cited by examiner

*Primary Examiner* — Eric A Rust
(74) *Attorney, Agent, or Firm* — Ronald E. Prass, Jr.; Prass LLP

(57) ABSTRACT

An apparatus and method share and manage passcodes across multiple printing device drivers. The method can include providing, on the electronic device, a first printing device driver for a first printing device and a second printing device driver for a second printing device. The first printing device driver and the second printing device driver can access a common secure printing device passcode storage location for secure printing device passcodes. The method can include storing at least one secure printing device passcode in the common secure printing device passcode storage location. The method can include displaying secure print information to the user in response to receiving a secure print input. The method can include sending a secure printing device passcode over the network interface to a printing device to securely print the document.

20 Claims, 5 Drawing Sheets

SHARING COMMON PRINTING PASSWORDS AMONG MULTIPLE PRINTING DEVICES CONNECTED TO NETWORK

BACKGROUND

Disclosed herein are a method and apparatus for sharing and managing passcodes across multiple printing device drivers.

Presently, printing devices, such as printers, copiers, and multi-function devices, provide users the ability to print from electronic devices, such as desktop or laptop computers, handheld computers, or other electronic devices, to printing devices connected to the electronic devices. The electronic devices may be stand alone devices, or may be connected to the electronic devices over a network, such as in a business, campus, or personal computing environment, that includes one or more printing devices.

In order for a printing device to interface with, and function with the electronic device to which it is connected, a printing device driver is typically installed on the electronic device. A printing device driver is software that controls the printing device from the electronic device. The printing device driver may include a user interface which is typically accessed by a user through an operating system or an application program, such as a word processing program, a spreadsheet program, or other types of programs, and viewed on a display.

Many printing devices support a secure print feature that allows a user to submit, to a printing device, a print job with a passcode. The printing device can hold the print job until the user walks to the printing device, selects the job for release using a printing device user interface, and then enters the print job passcode. Upon entry of a valid print job passcode, the printing device prints the print job.

Unfortunately, different printing devices may have different format requirements for the passcodes. This creates a problem when a user has multiple printer drivers and wants to reuse the same passcode for all the printer drivers. For example, many office customers have the ability to print to a variety of printing devices that support the secure print feature. However, the format of the passcode is not consistent across all printing devices. Some printing devices have strict limitations on the passcode length and allowable characters due to the printing device user interface and to provide better document protection. For example, many printing devices without keyboards support a numeric four digit passcode. Other printing devices with a keyboard may support longer alphanumeric passcodes. If an invalid passcode is sent in a secure print job, the job cannot be printed at the printing device. No existing printing device drivers provide passcode management capability. Currently, printing device drivers do not share passcode data across different printing device drivers and each printing device driver has its own passcode separate from all others.

Thus, there is a need for a method and apparatus for sharing and managing passcodes across multiple printing device drivers.

SUMMARY

An apparatus and method for sharing and managing passcodes across multiple printing device drivers are disclosed. The method can be in an electronic device including a network connection. The method can include providing, on the electronic device, a first printing device driver for a first printing device and a second printing device driver for a second printing device. The first printing device driver and the second printing device driver can access a common secure printing device passcode storage location for secure printing device passcodes. A secure printing device passcode can require entry of the secure printing device passcode at a printing device to print a document at the printing device. The method can include storing at least one secure printing device passcode in the common secure printing device passcode storage location. The method can include receiving a secure print input from a user. The secure print input can include an intent to securely print a document. The method can include displaying secure print information to the user in response to receiving the secure print input. The method can include sending a secure printing device passcode over the network interface to a printing device to securely print the document.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

Figure 1:
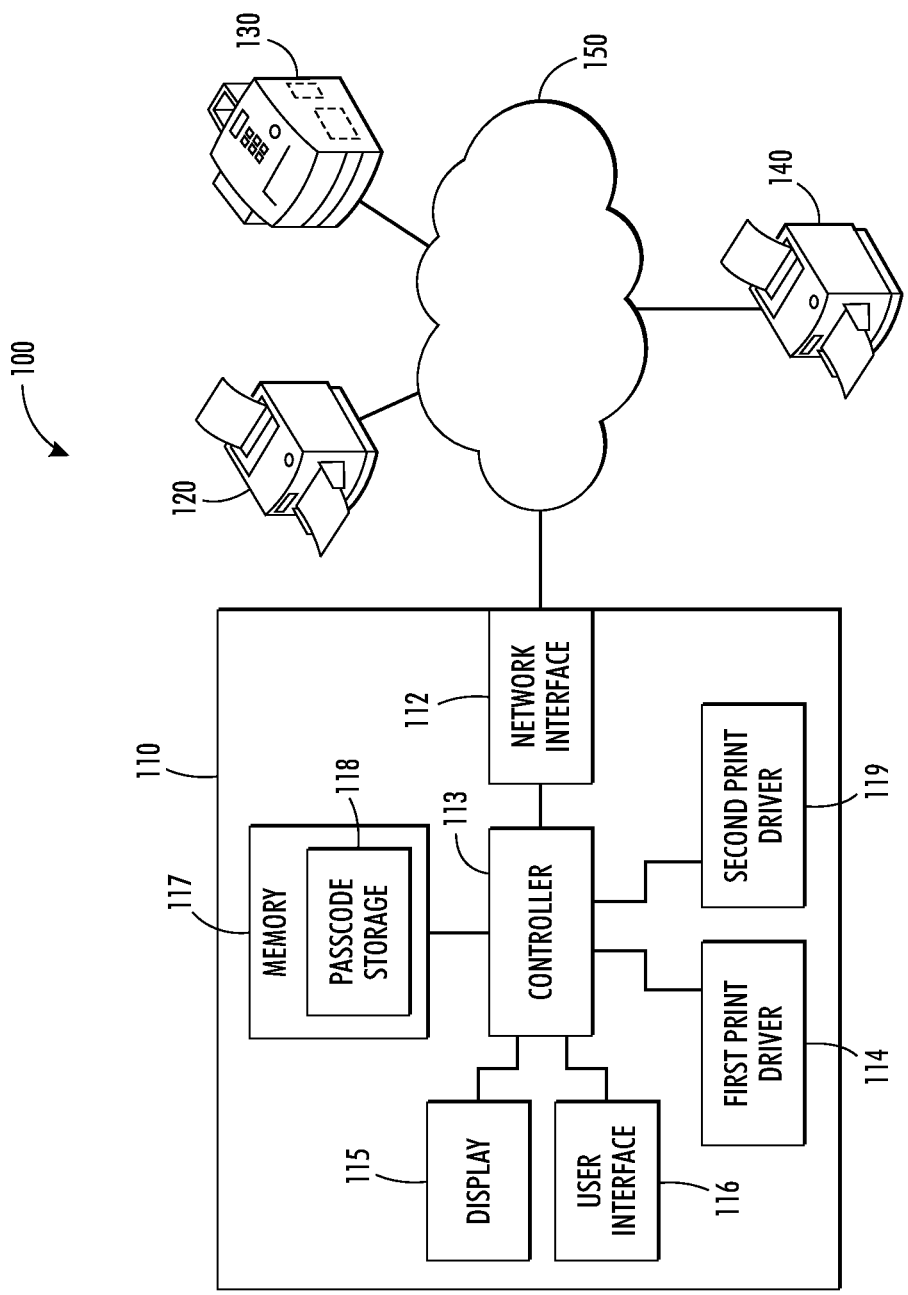
FIG. 1 illustrates an exemplary system according to one embodiment.

The embodiments include a method for sharing and managing passcodes across multiple printing device drivers. The method can be performed in an electronic device including a network interface. The method can include providing, on the electronic device, a first printing device driver for a first printing device and a second printing device driver for a second printing device. The first printing device driver and the second printing device driver can access a common secure printing device passcode storage location for secure printing device passcodes. A secure printing device passcode can require entry of the secure printing device passcode at a printing device to print a document at the printing device. The method can include storing at least one secure printing device passcode in the common secure printing device passcode storage location. The method can include receiving a secure print input from a user. The secure print input can include an intent to securely print a document. The method can include displaying secure print information to the user in response to receiving the secure print input. The method can include sending a secure printing device passcode over the network interface to a printing device to securely print the document.

The embodiments further include an apparatus for sharing and managing passcodes across multiple printing device drivers. The apparatus can include a controller configured to control operations of the apparatus. The apparatus can include a memory coupled to the controller. The memory can include a common secure printing device passcode storage location that stores at least one secure printing device passcode. A secure printing device passcode can require entry of the secure printing device passcode at a printing device to print a document at the printing device. The apparatus can include a first printing device driver installed on the apparatus for a first printing device. The first printing device driver can access the common secure printing device passcode storage location. The apparatus can include a second printing device driver installed on the apparatus for a second printing device. The second printing device driver can access the common secure printing device passcode storage location. The apparatus can include a user interface coupled to the controller. The user interface can be configured to receive a secure print input from a user. The secure print input can include an intent to securely print a document. The apparatus can include a display coupled to the controller. The display can be configured to display secure print information to the user in response to receiving the secure print input. The apparatus can include a network interface coupled to the controller. The network interface can be configured to send a secure printing device passcode to a printing device to securely print the document.

The embodiments further include a computer readable medium including a multiple printing device printing device driver that shares and manages passcodes across multiple printing device drivers. The computer readable medium can include a computer-usable data carrier storing a first printing device driver for a first printing device, the first printing device driver operable on a device with a second printing device driver for a second printing device. The first printing device driver and the second printing device driver can access a common secure printing device passcode storage location for secure printing device passcodes. A secure printing device passcode can require entry of the secure printing device passcode at a printing device to print a document at the printing device. The first printing device driver, when executed by a controller, can cause the controller to control an electronic device by storing at least one secure printing device passcode in the common secure printing device passcode storage location. The first printing device driver can cause the controller to control an electronic device by receiving a secure print input from a user. The secure print input can include an intent to securely print a document. The first printing device driver can cause the controller to control an electronic device by displaying secure print information to the user in response to receiving the secure print input. The first printing device driver can cause the controller to control an electronic device by sending a secure printing device passcode to a printing device to securely print the document.

FIG. 1 is an exemplary illustration of a system 100 according to one embodiment. The system 100 can include printing devices 120, 130, and 140, at least one user terminal 110, and at least one network 150. The printing devices 120, 130, and/or 140 may be printers, multifunction media devices, xerographic machines, ink jet printers, or any other devices that generate an image on media. The terminal 110, such as an electronic device, can be a desktop computer, a portable electronic device, a laptop computer, a mobile phone, a personal digital assistant, or any other electronic device.

The terminal 110 can include a network interface 112 configured to connect the terminal 110 to the network 150 and configured to communicate with at least one printing device, such as the printing devices 120, 130, and/or 140, over the network 150. The network interface 112 can be an Ethernet network connection, a Universal Serial Bus (USB) connection, a parallel port connection, a serial port connection, an 802.11-based wireless connection, a WiFi connection, a local area network connection, a wireless local area network connection, a wide area network connection, such as a cellular connection, or any connection that can connect an electronic device to a network and/or a printing device.

The terminal 110 can include a controller 113 coupled to the network interface 112. The controller 113 can be configured to control operations of the terminal 110 and can be configured to communicate over the network interface 112.

The terminal 110 can include a memory 117 coupled to the controller 113. The memory 117 may include a random access memory, a read only memory, an optical memory, a hard drive, a thumb drive, a floppy disk, a compact disk, or any other memory that can be used with an electronic device. The memory 117 can include a common secure printing device passcode storage location 118 that stores at least one secure printing device passcode. A secure printing device passcode can require entry of the secure printing device passcode at a printing device to print a document at the printing device.

The terminal 110 can include a first printing device driver 114 installed on the terminal 110 for a first printing device, such as the printer 120. A printing device driver may be provided by a party, such as a dealer or reseller, where the printing device driver can operate on printers and/or electronic devices the party does not own or control. The first printing device driver 114 can access the common secure printing device passcode storage location 118. The first printing device driver 114 can be coupled to the controller 113, can reside within the controller 113, can reside within the memory 117, can be an autonomous module, can be software, can be hardware, or can be in any other format useful for a printing device driver on an electronic device.

The terminal 110 can include a second printing device driver 119 installed on the terminal 110 for a second printing device 130. The second printing device driver 119 can access the common secure printing device passcode storage location 118. The second printing device driver 119 can be coupled to the controller 113, can reside within the controller 113, can reside within the memory 117, can be an autonomous module, can be software, can be hardware, or can be in any other format useful for a printing device driver on an electronic device.

The terminal 110 can include a user interface 116 coupled to the controller 113. The user interface 116 can include a keypad, buttons, a touch pad, a joystick, an additional display, a touch screen, or any other device useful for providing an interface between a user and an electronic device. The user interface 116 can be configured to receive a print command instructing the controller 113 to perform a print function. For example, the user interface 116 can be configured to receive a secure print input from a user. The secure print input can include an intent to securely print a document.

The terminal 110 can include a display 115 coupled to the controller 113. The display 115 can be a liquid crystal display (LCD), a light emitting diode (LED) display, a plasma display, a cathode ray tube display, a touch screen display, or any other means for displaying information. The display 115 can be configured to display secure print information to the user in response to receiving the secure print input.

The network interface 112 can be configured to send a secure printing device passcode to a printing device to securely print the document. The common secure printing device passcode storage location 118 can store a first secure printing device passcode for the first printing device driver. The user interface 116 can receive a secure print input for the second printing device driver. The display 115 can display, in response to the secure print input for the second printing device driver, secure print information including a field pre-populated with the first secure printing device passcode. The controller 113 can determine the first secure printing device passcode is not a valid secure printing device passcode for the second printing device driver. The display 115 can then display the secure print information including an option for secure printing device passcode management.

The common secure printing device passcode storage location 118 can store a first secure printing device passcode for the first printing device driver and store a second secure printing device passcode for the second printing device driver. The display 115 can display a list of secure printing device passcodes. The list of secure printing device passcodes can include the first secure printing device passcode and the second secure printing device passcode. The display 115 can display options for managing secure printing device passcodes. The common secure printing device passcode storage location 118 can store the same secure printing device passcode for the first printing device driver and the second printing device driver. For example, the secure printing device passcode for the first printing device driver can be the same passcode as the secure printing device passcode for the second printing device driver.

The memory 117 can be a computer-readable medium. The computer-readable medium can be a computer-usable data carrier storing a first printing device driver 114 for a first printing device. The first printing device driver 114 can be operable on a device with a second printing device driver 119 for a second printing device. The first printing device driver 114 and/or the second printing device driver 119, when executed by the controller 113, can cause the controller 113 to access the common secure printing device passcode storage location 118 for secure printing device passcodes. The secure printing device passcode can require entry of the secure printing device passcode at a printing device to print a document at the printing device The first printing device driver 114 can cause the controller 113 to control an electronic device by storing at least one secure printing device passcode in the common secure printing device passcode storage location 118. The first printing device driver 114 can cause the controller 113 to control an electronic device by receiving a secure print input from a user. The secure print input including an intent to securely print a document. The first printing device driver 114 can cause the controller 113 to control an electronic device by displaying secure print information to the user in response to receiving the secure print input. The first printing device driver 114 can cause the controller 113 to control an electronic device by sending a secure printing device passcode to a printing device to securely print the document. The first printing device driver 114 can cause the controller 113 to control an electronic device by storing, in the common secure printing device passcode storage location 118, the same secure printing device passcode for the first printing device driver and the second printing device driver.

Embodiments can provide a scheme for sharing passcodes across multiple printing device drivers. Embodiments can provide the ability to manage multiple passcodes across printer drivers in a user-friendly manner. Embodiments can provide the ability for a user to specify a passcode once and re-use it for all other printer drivers when the passcode is valid for the other printer drivers. Embodiments can provide a simple-to-user mechanism to manage and share multiple passcodes across printer drivers when a single passcode cannot be used.

For example, embodiments can provide a mechanism for sharing passcodes between and managing multiple passcodes across multiple printer drivers. The printer drivers can employ a common storage location for passcodes. When a user first uses the secure print feature, the print driver stores the passcode in this common storage location. When a user opens another printer driver and accesses the secure print feature, the another printer driver can pre-populate the passcode with the currently stored passcode if the passcode is valid for the another printer driver. If the passcode is not valid, the another printer driver can present the user a choice to continue to employ a single passcode or to manage multiple passcodes.

Figure 2:
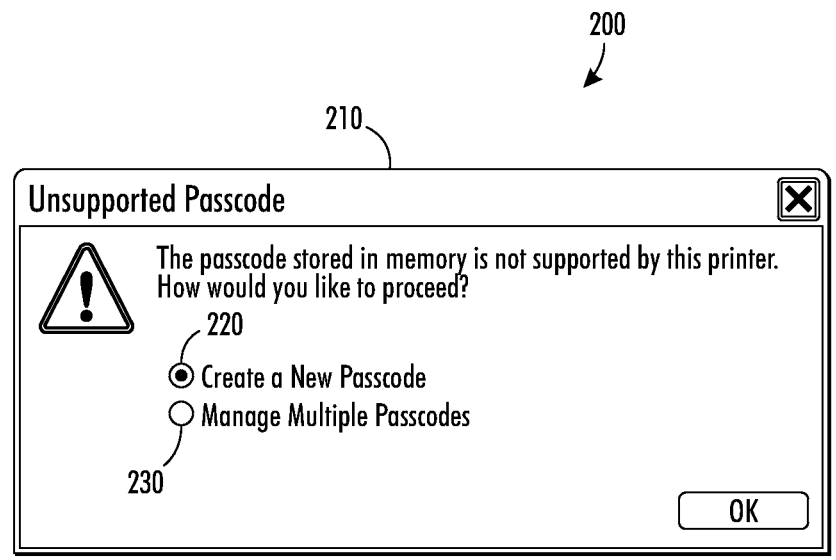
FIG. 2 illustrates an exemplary display showing an option screen according to one embodiment.

FIG. 2 illustrates an exemplary display 200 showing an option screen 210 according to one according to one embodiment. If a passcode is not valid, a printer driver can present the user the option screen 210 including choices to continue to employ a single passcode 220 or manage multiple passcodes 230. With the single passcode choice 220, the printer driver can present a window for the user to enter a new passcode that is valid for the currently selected printing device. This new passcode can be stored in the shared passcode location and can become the new default passcode. With the multiple passcode choice 230, the printer driver can present a window for the user to create a new passcode for the currently selected printing device and for the user to provide a display name for it.

Figure 3:
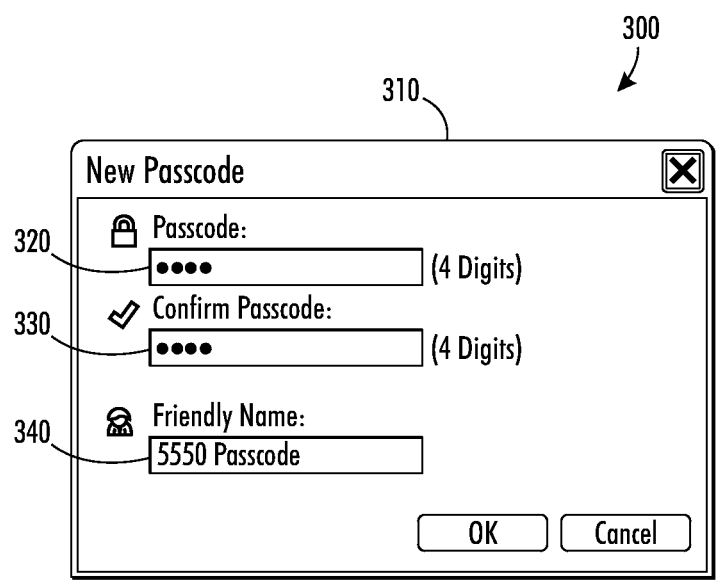
FIG. 3 illustrates an exemplary display showing a window for a user to create a new passcode for a currently selected printing device and for the user to provide a display name for it.

FIG. 3 illustrates an exemplary display 300 showing a window 310 for the user to create a new passcode for the currently selected printing device and for the user to provide a display name for it. The window 310 can include a new passcode field 320, a passcode confirmation field 330, and a friendly name field 340. After entering a new passcode in the new passcode field 320 and confirming the passcode in the passcode confirmation field 330, the user can enter a display name for the passcode in the friendly name field 340. This newly created passcode can be added to the passcode storage location 118. When a user later chooses the secure print option in a printer driver, a list of passcodes can be presented to the user.

Figure 4:
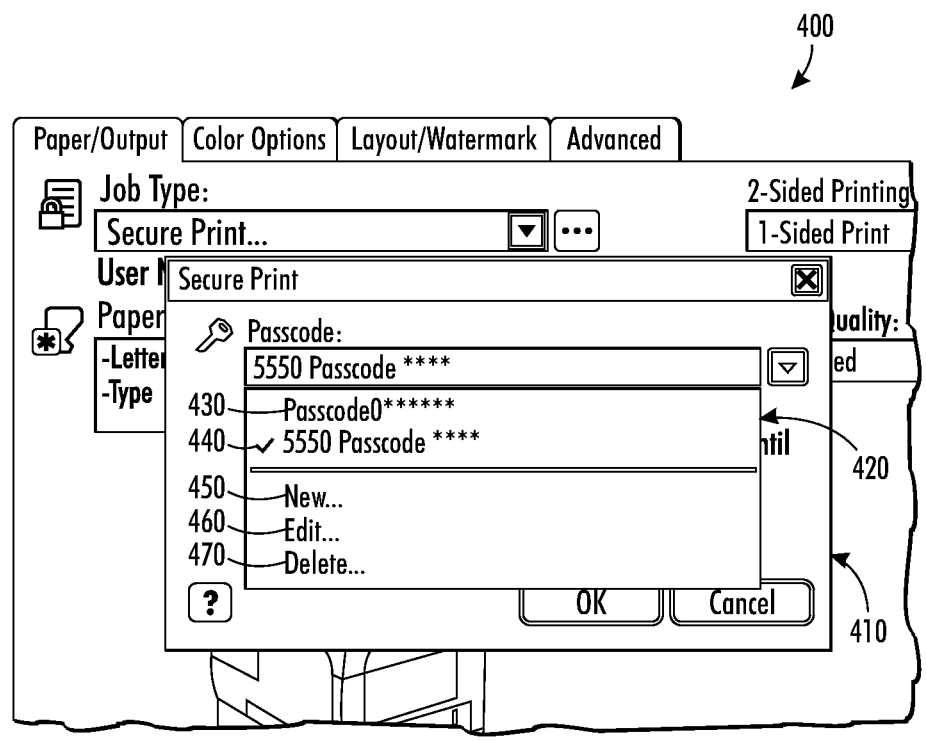
FIG. 4 illustrates an exemplary display showing a secure print window.

FIG. 4 illustrates an exemplary display 400 showing a secure print window 410. A printer driver can present the secure print window 410, which can provide list of passcodes 420 including at least a first passcode 430 and a second passcode 440. If a printer driver determines there is only one available or one appropriate passcode, the secure print window 410 may only present one passcode. The printer driver may also filter out inappropriate passcodes, such as passcodes in incompatible formats. The printer driver may also display, but shade out inappropriate passcodes or may include the passcodes in the list of passcodes 420. The printer driver can also provide operation options to manage the list of passcodes 420 in the secure print window 410. For example the operation options can include an option to add a passcode 450, an option to edit a passcode 460, an option to delete a passcode 470, and other operation options.

Embodiments can provide the ability for a printer driver to display the list of passcode formats supported by all the printer drivers installed on a computer and the ability to validate a passcode across all installed printer drivers. For example, a user can install four printer drivers for four different printing devices, such as Printer A, Printer B, Printer C, Multi Function Device (MFD) D. Printer A and B may only support a four-digit passcode. Printer C may support a 1-10 digit passcode. MFD D may support a 10-40 character alphanumeric passcode. From any of the printer drivers, the user can obtain the superset of passcode formats, such as four-digit, 1-10 digits, and 10-40 digits. The user can enter a passcode of '1234' and can validate it across all installed printer drivers to find out that the user needs to create a separate passcode for MFD D. Passcodes can also be implemented using an electronic-badge, can be based on credit-card information, can be entered anywhere in the system 100, can be based on a special dialed phone number, can be based on a web address, and/or can include biometric information, such as fingerprint, retinal scanner, and other biometric information, as well as any other information that can be used as a passcode.

Embodiments can provide for sharing of passcode data across multiple printer drivers. A user can employ the same passcode for printing to any printing device if it is valid for all of them without needing to continually enter the passcode. Embodiments can provide the ability to simply manage multiple passcodes for cases where a single passcode cannot be used for all of the user's printing devices.

Figure 5:
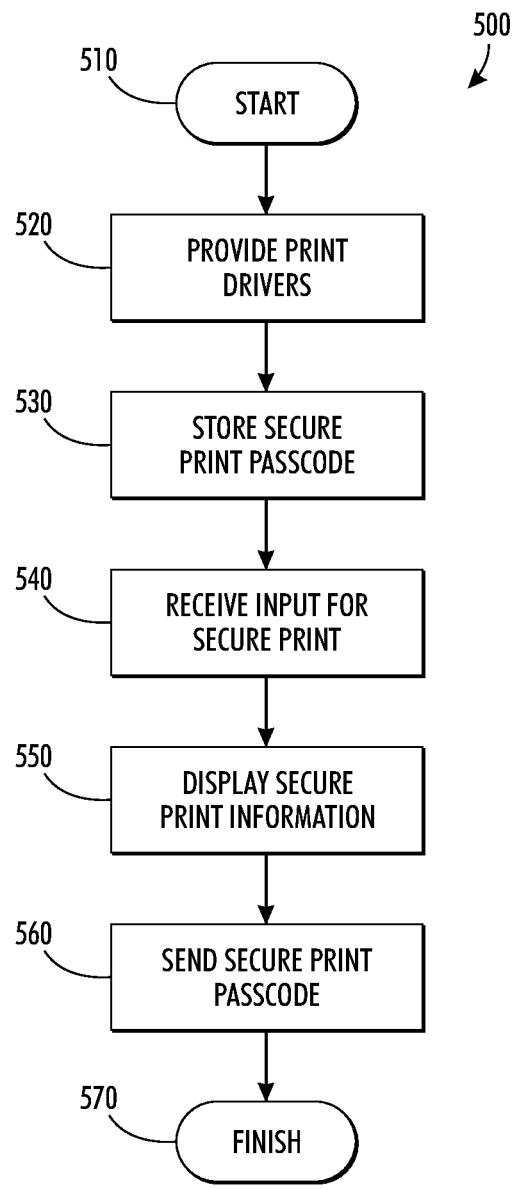
FIG. 5 illustrates an exemplary flowchart of a method of sharing and managing passcodes across multiple printing device drivers according to one embodiment.

FIG. 5 illustrates an exemplary flowchart 500 of a method of sharing and managing passcodes across multiple printing device drivers for an electronic device, such as the terminal 110, including a network connection according to one embodiment. The method can start at 510. At 520, a first printing device driver for a first printing device and a second printing device driver for a second printing device can be provided on the electronic device. The first printing device driver and the second printing device driver can access a common secure printing device passcode storage location for secure printing device passcodes. A secure printing device passcode can require entry of the secure printing device passcode at a printing device to print a document at the printing device.

At 530, at least one secure printing device passcode can be stored in the common secure printing device passcode storage location. At 540, a secure print input can be received from a user. The secure print input can include an intent to securely print a document. At 550, secure print information can be displayed to the user in response to receiving the secure print input. At 560, a secure printing device passcode can be sent over the network interface to a printing device to securely print the document.

Storing 530 can include storing, in the common secure printing device passcode storage location, a first secure printing device passcode for the first printing device driver. Receiving 540 can include receiving a secure print input for the second printing device driver. Displaying 550 can include displaying, in response to the secure print input for the second printing device driver, secure print information including a field pre-populated with the first secure printing device passcode.

Storing 530 can include storing a first secure printing device passcode for the first printing device driver and storing a second secure printing device passcode for the second printing device driver. Displaying 550 can include displaying a list of secure printing device passcodes. The list of secure printing device passcodes can include the first secure printing device passcode and the second secure printing device passcode. Displaying 550 can include displaying operation options for managing secure printing device passcodes. For example, the operation options for managing secure printing device passcodes can include an option for entering a new passcode, an option for editing stored passcodes, an option for deleting a stored passcode, and/or other options for managing secure printing device passcodes.

Displaying 550 can include displaying a list of available passcode formats for printing device drivers installed on the electronic device. Storing 530 can include storing, in the common secure printing device passcode storage location, a same secure printing device passcode shared between the first printing device driver and the second printing device driver. At 570, the method can end.

According to some embodiments, all of the blocks of the flowchart 500 are not necessary. Additionally, the flowchart 500 or blocks of the flowchart 500 may be performed numerous times, such as iteratively. For example, the flowchart 500 may loop back from later blocks to earlier blocks. Furthermore, many of the blocks can be performed concurrently, in parallel processes, or out of order.

Figure 6:
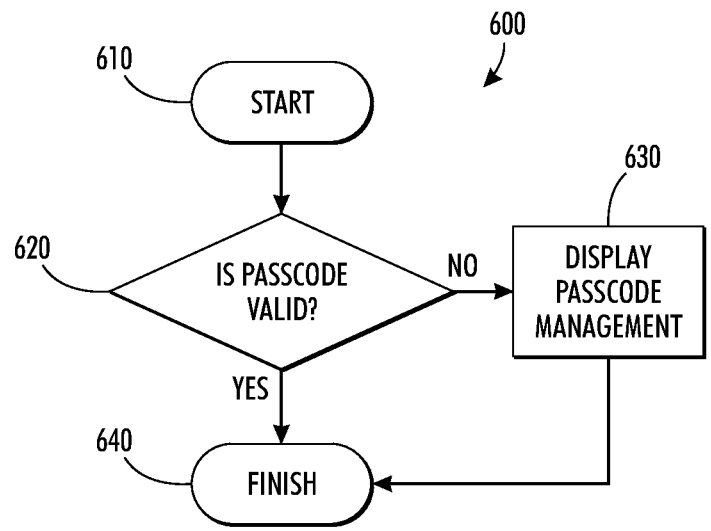
FIG. 6 illustrates an exemplary flowchart of a method of sharing and managing passcodes across multiple printing device drivers according to one embodiment.

FIG. 6 illustrates an exemplary flowchart 600 of a method of sharing and managing passcodes across multiple printing device drivers for an electronic device, such as the terminal 110, including a network connection according to one embodiment. The flowchart 600 can be combined into the flowchart 500. The method can start at 610. At 620, a determination can be made as to whether the first secure printing device passcode is valid. If the passcode is not valid, at 630, secure print information including an option for secure printing device passcode management can be displayed. At 640, the method can end.

According to some embodiments, all of the blocks of the flowchart 600 are not necessary. Additionally, the flowchart 600 or blocks of the flowchart 600 may be performed numerous times, such as iteratively. For example, the flowchart 600 may loop back from later blocks to earlier blocks. Furthermore, many of the blocks can be performed concurrently or in parallel processes.

Figure 7:
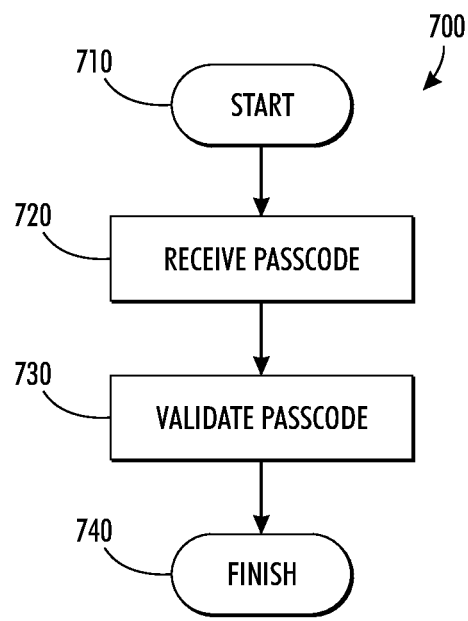
FIG. 7 illustrates an exemplary flowchart of a method of sharing and managing passcodes across multiple printing device drivers according to one embodiment.

FIG. 7 illustrates an exemplary flowchart 700 of a method of sharing and managing passcodes across multiple printing device drivers for an electronic device, such as the terminal 110, including a network connection according to one embodiment. The flowchart 700 can be combined into the flowchart 500. The method can start at 710. At 720, a passcode can be received from a user. At 730, a format of the passcode can be validated for printing device drivers installed on the electronic device. The received passcode may not be sent to the printing device if the passcode is invalid for the printing device. At 740, the method can end.

According to some embodiments, all of the blocks of the flowchart 700 are not necessary. Additionally, the flowchart 700 or blocks of the flowchart 700 may be performed numerous times, such as iteratively. For example, the flowchart 700 may loop back from later blocks to earlier blocks. Furthermore, many of the blocks can be performed concurrently or in parallel processes.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in an electronic device including a network interface, the method comprising:
    providing, on the electronic device, a first printing device driver for a first printing device and a second printing device driver for a second printing device, the first printing device driver and the second printing device driver having access to a common secure printing device passcode storage location to acquire secure printing device passcodes, a secure printing device passcode being required at the first printing device or at the second printing device to print a document;
    storing at least one secure printing device passcode in the common secure printing device passcode storage location;
    receiving through a user interface a secure print input from a user, the secure print input including an intent to securely print a document;
    displaying at the user interface secure printing device information in response to receiving the secure print input, wherein the displaying comprises at least a list of the secure printing device passcodes and secure printing device passcode management with an option to select at least one of delete passcode, add passcode, and edit passcode; and
    sending a secure printing device passcode over the network interface to a printing device to securely print the document;
    wherein when a user selects the secure print option at the first printing device driver or at the second printing device driver, the electronic device causes the user interface to display a list of passcode choices with a passcode field pre-populated with default passcodes, to display an option to provide a new valid default passcode, and to display an option to provide a new named passcode for a target printing device that is then stored at the common secure printing device passcode storage location.

2. The method according to claim 1, wherein storing further comprises storing, in the common secure printing device passcode storage location, a first secure printing device passcode for the first printing device driver.

3. The method according to claim 2, wherein receiving further comprises receiving a secure print input for the second printing device driver.

4. The method according to claim 3, wherein displaying further comprises displaying, in response to the secure print input for the second printing device driver, secure printing device information including a field pre-populated with the first secure printing device passcode.

5. The method according to claim 3, further comprising: if after determining that the first secure printing device passcode is not a valid secure printing device passcode for the second printing device driver then displaying at the user interface options to select at least one of delete passcode, add passcode, and edit passcode.

6. The method according to claim 1, wherein storing further comprises storing a first secure printing device passcode for the first printing device driver and storing a second secure printing device passcode for the second printing device driver.

7. The method according to claim 6, wherein displaying further comprises displaying a list of secure printing device passcodes, the list of secure printing device passcodes including the first secure printing device passcode and the second secure printing device passcode.

8. The method according to claim 6, wherein displaying further comprises displaying operation options for managing the secure printing device passcodes.

9. The method according to claim 1, further comprising displaying a list of available passcode formats for the printing device drivers installed on the electronic device.

10. The method according to claim 1, further comprising:
    receiving a passcode from a user; and
    validating a format of the passcode for the printing device drivers installed on the electronic device.

11. The method according to claim 10, further comprising abstaining from sending the received passcode to the printing device if the passcode is invalid for the printing device.

12. The method according to claim 1, wherein storing further comprises storing, in the common secure printing device passcode storage location, a same secure printing device passcode shared between the first printing device driver and the second printing device driver.

13. An apparatus comprising:
    a controller configured to control operations of the apparatus;
    a memory coupled to the controller, the memory including a common secure printing device passcode storage location that stores at least one secure printing device passcode, a secure printing device passcode being required at a first printing device or a second printing device to print a document;

a first printing device driver installed on the apparatus for the first printing device, the first printing device driver having access to the common secure printing device passcode storage location;

a second printing device driver installed on the apparatus for the second printing device, the second printing device driver having access to the common secure printing device passcode storage location;

a user interface coupled to the controller, the user interface configured to receive a secure print input from a user, the secure print input including an intent to securely print a document;

a display coupled to the controller, the display configured for displaying secure printing device information to the user in response to receiving the secure print input, wherein the displaying comprises at least a list of the secure printing device passcodes and secure printing device passcode management with an option to select at least one of delete passcode, add passcode, and edit passcode; and a network interface coupled to the controller, the network interface configured to send a secure printing device passcode to a printing device to securely print the document;

wherein when a user selects the secure print option at the first printing device driver or at the second printing device driver, the controller causes the user interface to display a list of passcode choices with a passcode field pre-populated with default passcodes, to display an option to provide a new valid default passcode, and to display an option to provide a new named passcode for a target printing device that is then stored at the common secure printing device passcode storage location.

14. The apparatus according to claim 13, wherein the common secure printing device passcode storage location stores a first secure printing device passcode for the first printing device driver, and wherein the user interface is configured to receive a secure print input for the second printing device driver.

15. The apparatus according to claim 14, wherein the display is configured to display, in response to the secure print input for the second printing device driver, secure printing device information including a field pre-populated with the first secure printing device passcode.

16. The apparatus according to claim 14, wherein the controller is configured to determine that if the first secure printing device passcode is not a valid secure printing device passcode for the second printing device driver then displaying an option for secure printing device passcode management.

17. The apparatus according to claim 13, wherein the common secure printing device passcode storage location is configured to store a first secure printing device passcode for the first printing device driver and store a second secure printing device passcode for the second printing device driver, and wherein the display is configured to display a list of secure printing device passcodes, the list of secure printing device passcodes including the first secure printing device passcode and the second secure printing device passcode.

18. The apparatus according to claim 13, wherein the display is configured to display options for managing the secure printing device passcodes.

19. A non-transitory computer readable medium encoded with computer executable instructions, which when accessed, cause a machine to perform operations comprising:

a computer-usable data carrier storing a first printing device driver for a first printing device, the first printing device driver operable on a device with a second printing device driver for a second printing device, the first printing device driver and the second printing device driver having access to a common secure printing device passcode storage location to acquire secure printing device passcodes, a secure printing device passcode being required at the first printing device or at the second printing device to print a document, the computer executable instructions when executed by a controller causes the controller to control an electronic device by:

storing at least one secure printing device passcode in the common secure printing device passcode storage location;

receiving through a user interface a secure print input from a user, the secure print input including an intent to securely print a document;

displaying at the user interface secure printing device information in response to receiving the secure print input, wherein the displaying comprises at least a list of the secure printing device passcodes and secure printing device passcode management with an option to select at least one of delete passcode, add passcode, and edit passcode; and sending a secure printing device passcode to a printing device to securely print the document;

wherein when a user selects the secure print option at the first printing device driver or at the second printing device driver, the controller causes the user interface to display a list of passcode choices with a passcode field pre-populated with default passcodes, to display an option to provide a new valid default passcode, of and to display an option to provide a new named passcode for a target printing device that is then stored at the common secure printing device passcode storage location.

20. The non-transitory computer readable medium of claim 19, said machine to adapt cause the controller to control an electronic device by storing, in the common secure printing device passcode storage location, the same secure printing device passcode for the first printing device driver and the second printing device driver.

* * * * *